(12) United States Patent
Bano (10) Patent No.: US 11,383,243 B2
(45) Date of Patent: Jul. 12, 2022

(54) SHREDDER

(71) Applicant: Claudio Bano, Campodarsego (IT)

(72) Inventor: Claudio Bano, Campodarsego (IT)

( * ) Notice: Subject to any disclaimer, the term of this patent is extended or adjusted under 35 U.S.C. 154(b) by 115 days.

(21) Appl. No.: 16/803,425

(22) Filed: Feb. 27, 2020

(65) Prior Publication Data

US 2020/0269252 A1 Aug. 27, 2020

(30) Foreign Application Priority Data

Feb. 27, 2019 (IT) .................. 102019000002797

(51) Int. Cl.
  *B02C 13/14* (2006.01)
  *B02C 13/16* (2006.01)
  *B02C 13/28* (2006.01)
  *B02C 13/282* (2006.01)

(52) U.S. Cl.
  CPC .............. *B02C 13/16* (2013.01); *B02C 13/28* (2013.01); *B02C 13/282* (2013.01); *B02C 2013/2808* (2013.01)

(58) Field of Classification Search
  CPC ......... B02C 13/28; B02C 13/08; B02C 13/16; B02C 2013/282; B02C 2013/14
  See application file for complete search history.

(56) References Cited

U.S. PATENT DOCUMENTS

| | | | | |
|---|---|---|---|---|
| 3,210,015 A * | 10/1965 | Herber | .................... | B02C 13/14 241/56 |
| 3,993,256 A * | 11/1976 | Brewer | ................... | B02C 13/16 241/186.5 |
| 4,369,548 A * | 1/1983 | Malinak | .................. | B02C 13/16 19/26 |
| 5,205,500 A * | 4/1993 | Eide | ........................ | B02C 13/18 241/154 |
| 5,680,994 A * | 10/1997 | Eide | ........................ | B02C 13/18 241/154 |
| 5,865,381 A * | 2/1999 | Mitsumura | .............. | B01J 2/006 241/24.1 |
| 6,179,231 B1 * | 1/2001 | Csendes | .................. | B02C 13/18 241/97 |
| 6,227,473 B1 * | 5/2001 | Arnold | .................... | B02C 13/18 241/285.1 |
| 6,325,306 B1 * | 12/2001 | Gacanich | ................ | B02C 13/18 241/15 |

(Continued)

FOREIGN PATENT DOCUMENTS

DE 102011089615 A1 6/2013

OTHER PUBLICATIONS

IT Search Report dated Nov. 6, 2019 re: Application No. IT 2019000002797, pp. 1-6, citing: US 2016/0144371 A1, US 2018/0297034 A1, US 2016/0045919 A1 and DE 10 2011 089615 A1.

*Primary Examiner* — Faye Francis
(74) *Attorney, Agent, or Firm* — Cantor Colburn LLP (57) ABSTRACT

A shredder having
  a substantially tubular casing, which is closed upward by a cover and downward by a base. The shredder also includes
  a rotating shaft, which is internal and coaxial to the casing, with multiple supporting elements being keyed on the shaft, each element for supporting a number of shredding elements.
The shredding elements have circular trajectories with a circumference that at least partially increases from the upper part toward the lower part of the shredder.

18 Claims, 5 Drawing Sheets

(56) References Cited

U.S. PATENT DOCUMENTS

| | | | | |
|---|---|---|---|---|
| 6,637,682 | B2* | 10/2003 | Akiyama | B02C 18/12 |
| | | | | 241/97 |
| 9,751,087 | B2* | 9/2017 | Watts | B02C 13/14 |
| 10,807,097 | B2* | 10/2020 | Mogan | B02C 13/18 |
| 11,084,040 | B1* | 8/2021 | Sontag | B02C 13/14 |
| 2009/0194620 | A1* | 8/2009 | Potter | B02C 19/0025 |
| | | | | 241/134 |
| 2009/0194624 | A1* | 8/2009 | Knueven | B02C 13/185 |
| | | | | 241/275 |
| 2011/0101141 | A1* | 5/2011 | Koslow | B02C 13/282 |
| | | | | 241/195 |
| 2014/0166795 | A1* | 6/2014 | Mogan | B02C 13/18 |
| | | | | 241/191 |
| 2016/0045919 | A1 | 2/2016 | McDaniel et al. | |
| 2016/0144371 | A1 | 5/2016 | Sontag | |
| 2016/0228879 | A1* | 8/2016 | Scharfe | B02C 13/282 |
| 2018/0297034 | A1 | 10/2018 | Grosch et al. | |
| 2020/0129986 | A1* | 4/2020 | Gronholz | B02C 13/282 |
| 2020/0238292 | A1* | 7/2020 | Bush | B02C 18/18 |

* cited by examiner

SHREDDER

CROSS REFERENCE TO RELATED APPLICATIONS

This application is related to and claims the benefit of Italian Patent Application No. 102019000002797, filed on Feb. 27, 2019, the contents of which are hereby incorporated by reference in their entirety.

TECHNICAL FIELD

The present disclosure relates to a shredder. The disclosure is applicable in the industrial field in the sector of recycling and in particular in the recycling of small articles made of materials that are not uniform, for the recovery of metallic materials and plastic, such as, for example, articles such as: electrical cables, polyurethane panels, electric fans, and rotors of electric motors.

BACKGROUND

Currently, in order to recover the materials from scrap, the scrap is is normally first partially disassembled by hand or subjected to primary milling in order to obtain fragments.

These fragments are then subjected to shredding in one or more shredders with a vertical or horizontal axis, in order to obtain small shreds, even on the order of a few millimeters.

These shredders generally comprise a rotating shaft, which is arranged internally and coaxially to an external tubular casing, which is closed at one end by a cover with an inlet for the fragments and at the other end by an apparatus for recovering the generated shreds.

Discs for supporting shredding elements, usually blades which face complementary blades that extend from the internal surface of the casing, are keyed on the rotating shaft. These discs all have the same dimensions and are normally arranged at a constant mutual distance.

After shredding, the metallic shreds are separated from the plastic shreds, for example by using magnetic means or by virtue of specific gravity selectors.

These conventional methods have drawbacks.

Considering shredders with a vertical axis, in order to be able to obtain shreds of the chosen size, usually a grille is placed on the bottom of the shredder and is adapted to allow the passage only of shreds smaller than a certain size and to retain the outsize shreds, which must subsequently be subjected to shredding again.

Furthermore, in order to be able to separate some types of metal from the plastic material associated with them, in millimeter- or micrometer-sized articles, it is necessary to perform a further precision shredding operation, or specific operations suitable for the same purpose. This is the case, for example, of the recovery of copper from electrical cables.

Moreover, coarser and more massive elements, such as for example bolts, tend to damage the blades and the complementary blades, triggering a chain failure with consequent halting of the entire apparatus.

Finally, the shredders with a vertical axis that are used are awkward to inspect, maintain and clean: in order to be able to access the discs and the blades it is in fact necessary to remove the shaft from above, removing the cover and using bulky bridge crane systems. In order to remove the cover it is necessary to remove the fastening elements, such as for example bolts. In order to be able to remove the shaft it is furthermore necessary to uninstall it from its base.

SUMMARY

The aim of the present disclosure is to provide a shredder that is capable of improving the background art in one or more of the aspects indicated above.

Within this aim, the disclosure provides a shredder that does not have or require a screening grille in order to obtain shreds of the desired size and does not require a further precision shredding operation or specific operations in order to be able to separate different types of materials.

The disclosure further provides a shredder that is easier, less awkward and quicker to inspect, clean and maintain with respect to shredders of the known type.

The disclosure also provides a shredder in which the coarser and more massive elements are not capable of causing damage.

The disclosure further provides a shredder that is highly reliable, relatively simple to provide and at competitive costs.

This aim, these advantages and others which will become better apparent hereinafter are achieved by providing a shredder of the type with a vertical axis, comprising:
- a substantially tubular casing, which is closed upward by a cover and downward by a base,
- a rotating shaft, which is internal and coaxial to said casing, multiple supporting elements being keyed on said shaft, each supporting a plurality of shredding elements, said shredder being characterized in that said shredding elements have circular trajectories with a circumference that at least partially increases from the upper part toward the lower part of the shredder.

BRIEF DESCRIPTION OF THE DRAWINGS

Further characteristics and advantages of the disclosure will become better apparent from the description of a preferred but not exclusive embodiment of the shredder according to the disclosure, illustrated by way of nonlimiting example in the accompanying drawings, wherein.

DETAILED DESCRIPTION OF THE DRAWINGS

With reference to FIGS. 1-6, a shredder according to the disclosure is designated generally by the reference numeral 10.

The shredder 10 has a vertical axis.

The shredder 10 comprises a casing 11 which is substantially tubular and is closed upward by a cover 12 and downward by a base 22.

The shredder 10 comprises, inside the external casing 11, a rotating shaft 13 which is coaxial to the external casing 11.

Multiple supporting elements 14 are keyed on the rotating shaft 13 and each supports a plurality of shredding elements 15.

The supporting elements 14 are substantially but not necessarily disc-shaped.

Figure 5A:
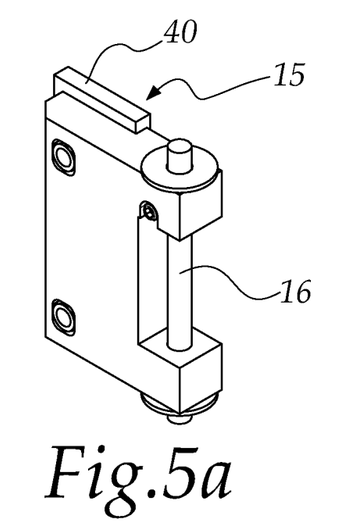
FIGS. 5a and 5b are views of a component of the shredder of FIG. 1.
Figure 5B:
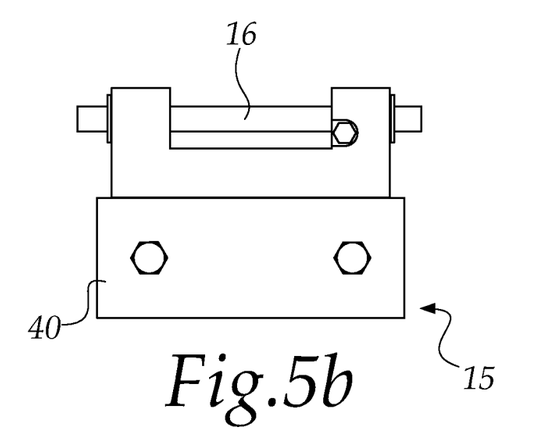

The shredding elements 15 are for example flat hammers such as the one shown in FIGS. 5a and 5b.

The shredding elements 15 are coupled to at least one of the supporting elements 14 but are movable with respect to it.

The elements 15 are hinged to at least one of the elements 14.

In this manner, when, during rotary motion, the shredding elements 15 encounter the coarser and more massive elements, such as for example bolts, they move, allowing them to fall to the lower level, and so forth.

The shredder 10 does not have a grille on the bottom of the casing 11; in this manner, the coarser and more massive elements are the first to be expelled from the shredder.

By virtue of these solutions, damage to the shredding elements 15, wear of the various elements and the consequent interruptions in processing are avoided, and the operating life of the shredder 10 is extended.

One of the particularities of the shredder 10 resides in that the shredding elements 15 have circular trajectories with a circumference that at least partially increases from the upper part toward the lower part of the shredder 10.

In particular, at least some of the shredding elements 15 are hinged, by means of hinge elements 16, to at least two parallel supporting elements 14.

The shredding elements 15 comprise applied portions 40, which extend in the direction of the internal surface of the casing 11. In this manner it is possible to replace the applied portion 40, once worn, without the need to remove and replace the entire supporting element 14 or the shredding element 15.

The casing 11 is provided with an internal surface covered by a plurality of applied elements 35, which can be replaced as needed, each comprising a plurality of complementary shredding elements 36 which extend in the direction of the shredding elements 15.

Figure 6:
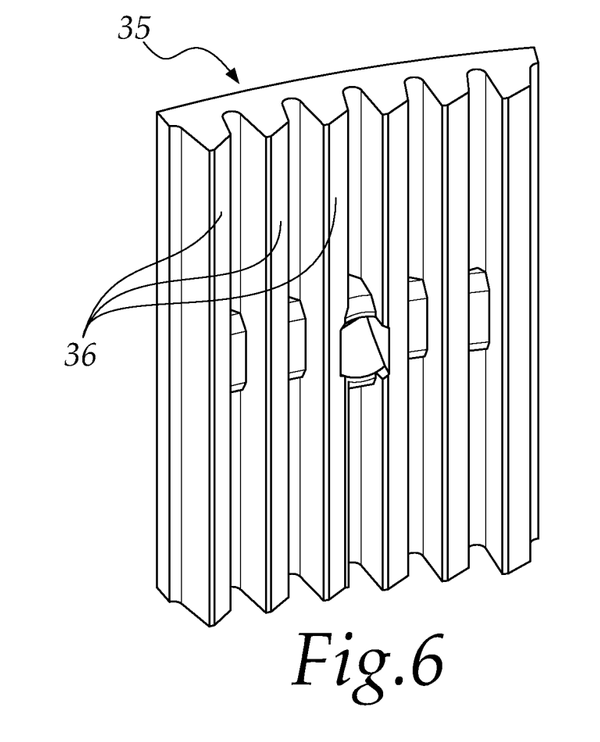
FIG. 6 is a view of another component of the shredder of FIG. 1.

FIG. 6 shows one of said applied elements 35.

The applied portions 40 of the shredding elements 15 are made of metallic alloys based on a manganese or of the material known by the trade name Hardox.

The applied elements 35 of the casing 11 are made of material with metal alloys based on chromium-manganese.

The shaft 13 is moved by motor means 18 with variable speed and direction of rotation, by means of a pulley 19 which is keyed thereon, and a belt 20 for transmitting motion between the motor means 18 and the pulley 19.

An inlet 21 for introducing the articles to be shredded is placed in a first fixed region 25 of the cover 12.

The inlet 21 has a rectangular profile.

In a second region 26 that is substantially mirror-symmetrical with respect to the first region 25, the cover 12 is constituted by two portions 23 and 23b which can be opened individually.

In particular, each portion 23a and 23b has an external surface substantially shaped like a quarter circle. Each portion 23a, 23b, symmetrically with respect to each other, is coupled to the fixed region 25 by means of a hinge 30.

The hinge 30 is arranged proximate to an end 28a, 28b of the circular are defined by the same portion 23a, 23b of the cover 12.

The ends 29a, 29b of these two circular arcs that are opposite the hinged ones 28a, 28b, respectively of the portion 23a and of the portion 23b, are adjacent.

A corresponding curved portion 31a, 31b of the casing 11 is arranged below each portion 23a, 23b of the cover 12 and is coupled to the respective portion 23a, 23b of the cover 12 and hinged to a fixed portion 32 of the casing 11, on the same axis of the hinge 30 of the portion 23a, 23b.

In particular, a plurality of superimposed annular elements 41 extends around the tubular walls of the casing 11 and each is constituted by portions which are monolithic with the corresponding portion of the casing 11. Each openable portion 31a and 31b of the casing 11 has a plurality of portions 42, substantially shaped like a quarter ring, which correspond to a part of the annular elements 41.

Each one of these quarter-ring portions 42 is coupled, by virtue of a hinge 44, to a corresponding portion 43 of the respective annular element 41 monolithically with the fixed portion 32 of the casing 11.

In particular, the hinge 30 of the portion 23a, 23b of the cover 12 has the same axis of rotation as the lower hinges 44 of the portions 42.

The curved portions 31a and 31b of the casing 11 are adjacent and symmetrical with respect to the vertical plane of symmetry of the casing 11.

In this manner it is possible to easily move one of the two curved portions 31a or 31b, together with the corresponding portion 23a or 23b of the cover 12 for the inspection, maintenance and cleaning operations.

Furthermore, by moving both curved portions 31a, 31b it is possible to open the casing 11 and access completely the shaft 13 and the shredding elements 15 without moving the shaft itself.

The adjacent edges of the curved portions 31a and 31b of the casing 11 are mutually fixed by means of a plurality of removable couplings 45.

Figure 1:
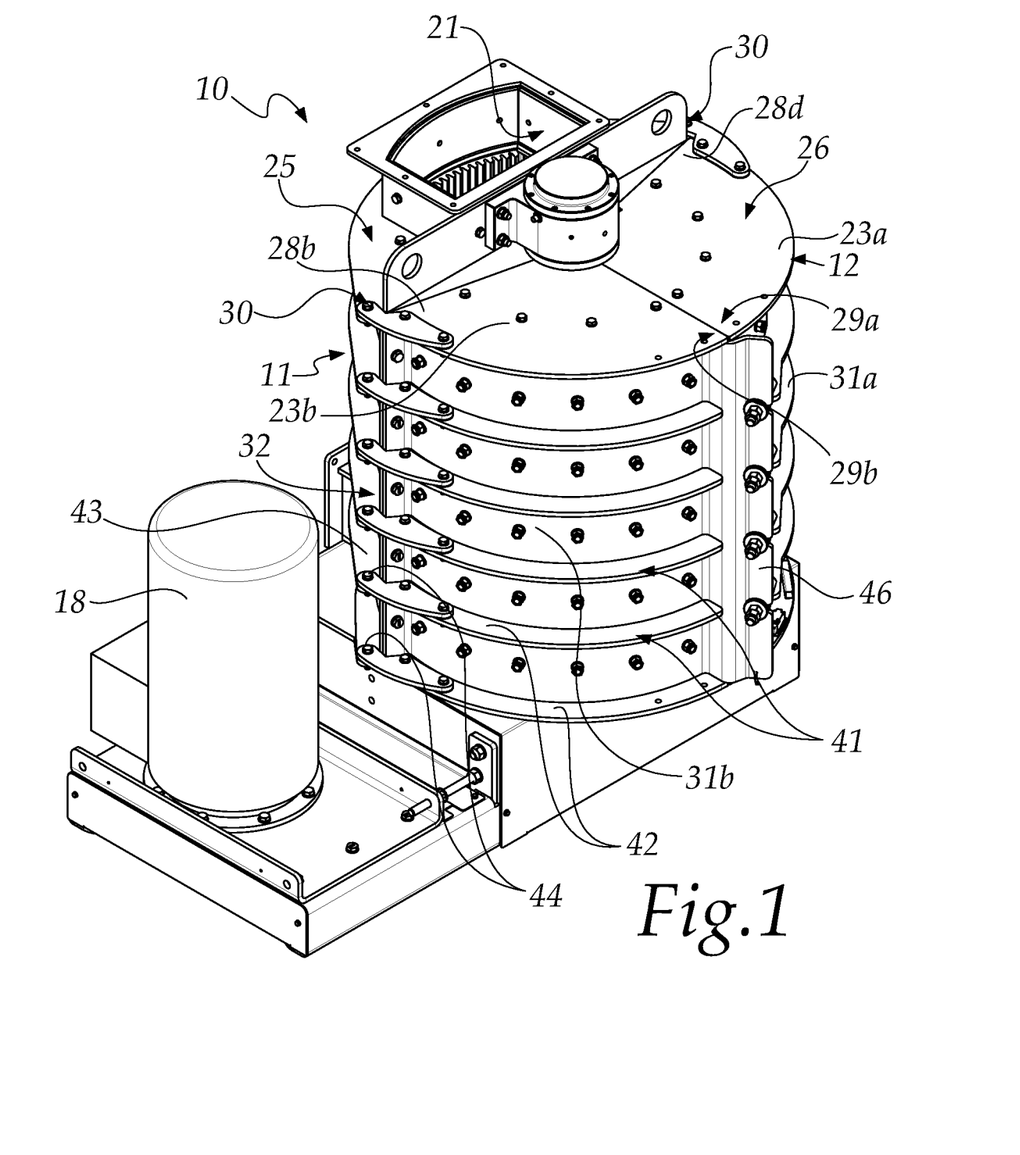
FIG. 1 is a general perspective view of a shredder according to the disclosure.
Figure 2:
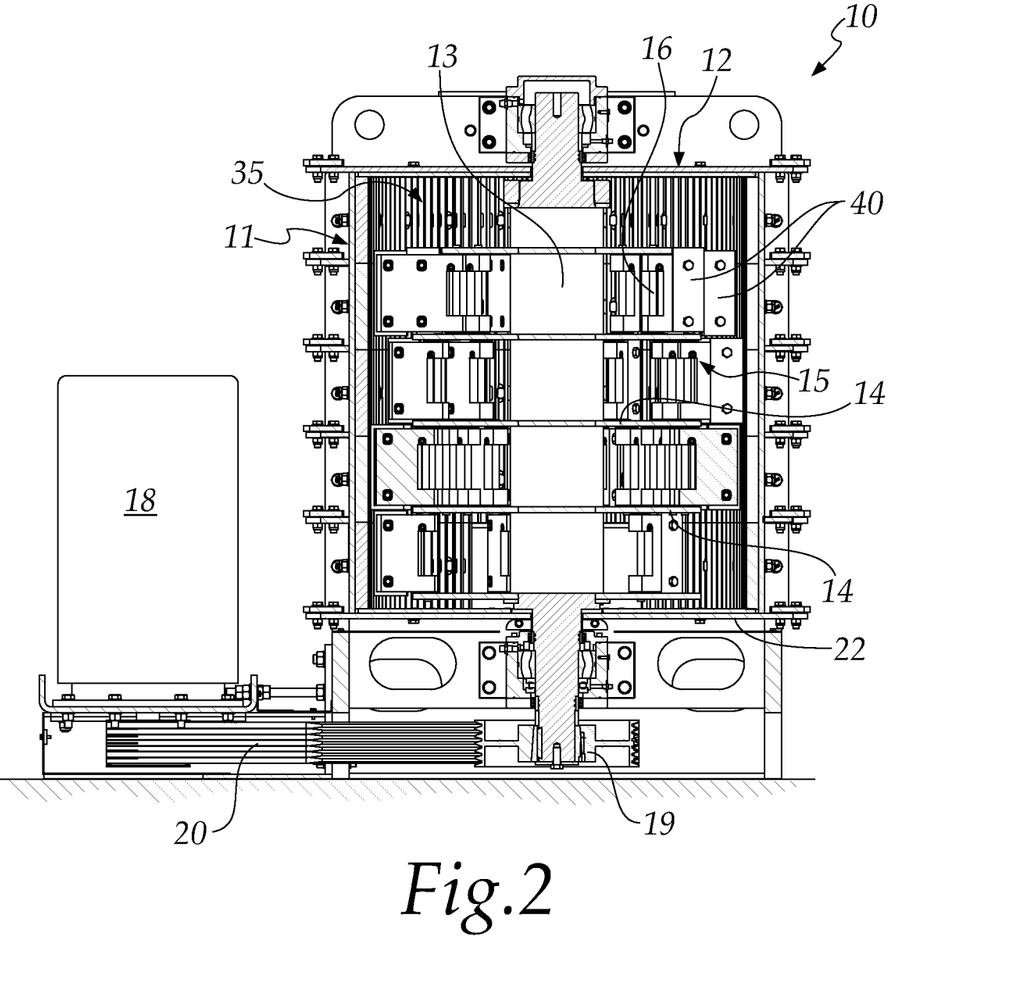
FIG. 2 is a sectional view of the shredder of FIG. 1.
Figure 3:
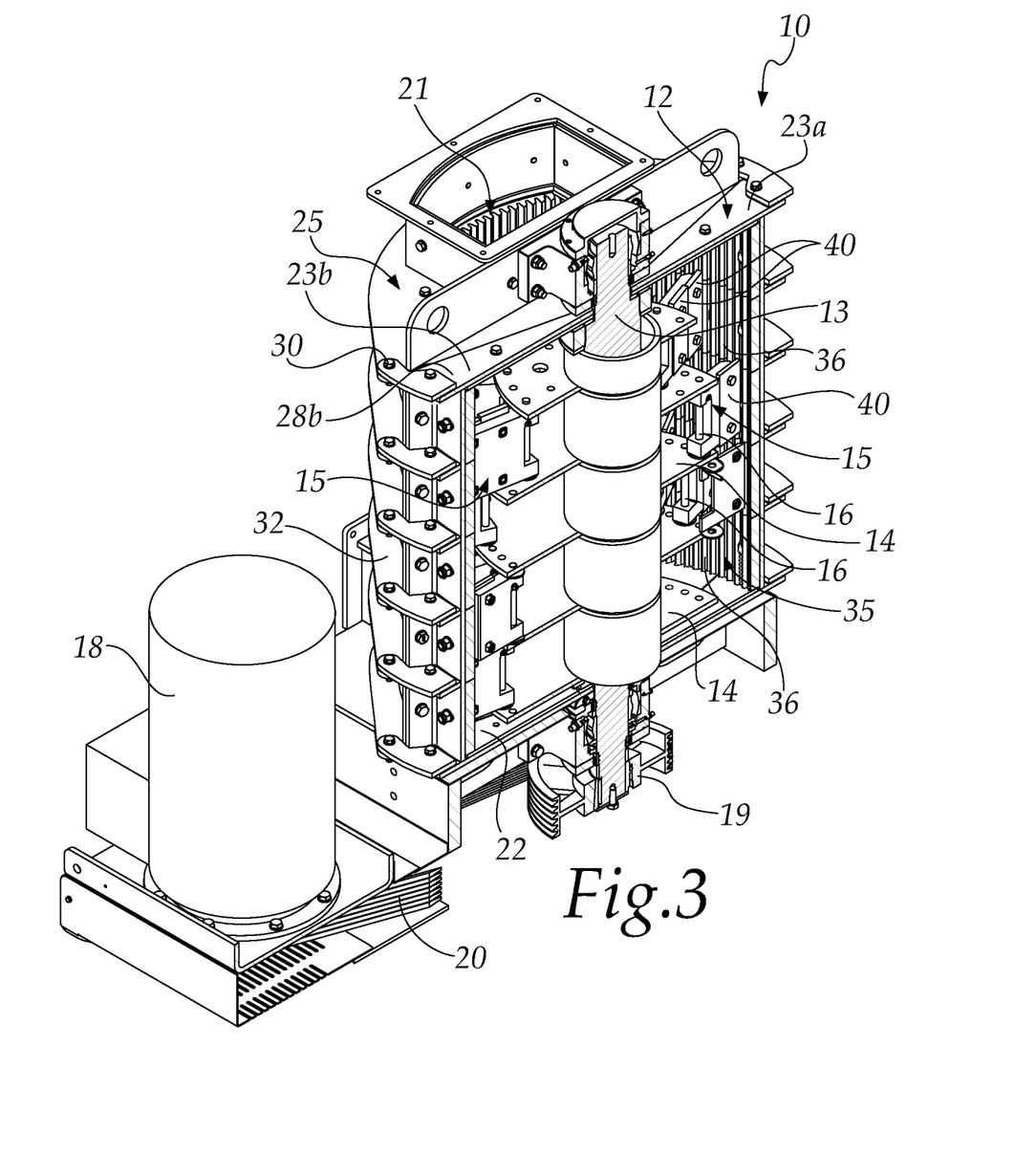
FIG. 3 is a different sectional view of the shredder of FIG. 1.
Figure 4:
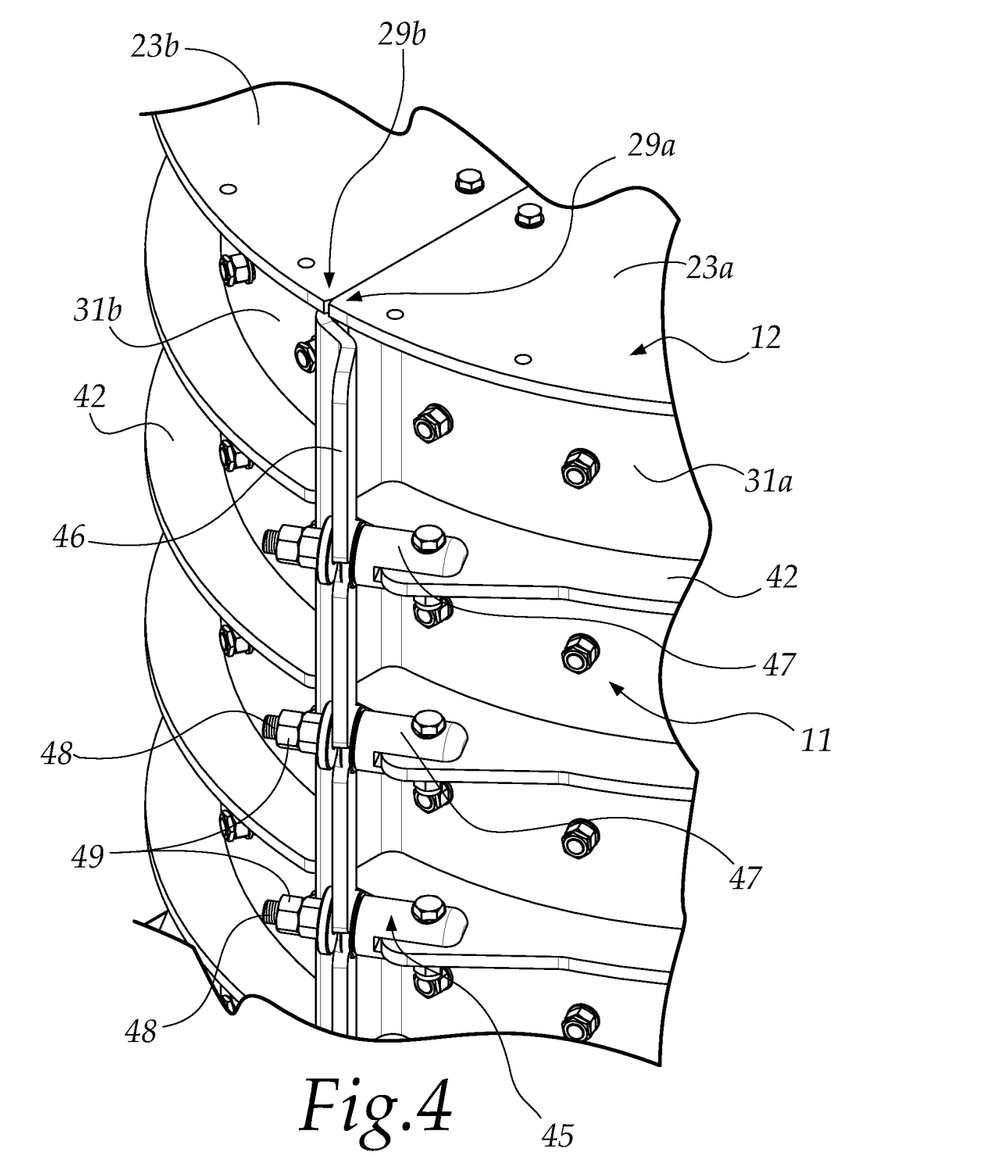
FIG. 4 is a view of a detail of the shredder of FIG. 1.

With reference to FIG. 4, for example, the portion 31b of the casing 11 has, at the opposite portion 31a, a vertically extended flap 46 which protrudes towards the outside of the casing 11.

Multiple openings are present on said flap 46, each at an annular element 41.

Each one of said openings is adapted for the insertion of an oscillating element 47, which is hinged to the corresponding quarter-ring portion 42 of the opposite curved portion 31a of the casing 11.

Each oscillating element 47 has a threaded stem 48 onto which one or more nuts 49 are to be screwed to fasten the flap 46 of the portion 31b to the opposite portion 31a.

In this manner it is possible to lock the two curved portion 31a and is 31b rapidly or release them when it is necessary to move one of them for cleaning operations.

Proximate to the base 22 of the casing 11 there is a system for recovering the generated shreds, of a per se known type, not shown in the figures.

In a preferred but not exclusive embodiment, the supporting elements 14 and the corresponding shredding elements 15 define, downward from above, substantially four processing stages:

a first crushing stage, in which the scrap is crushed, a second disaggregation stage, in which the fragments are reduced to shreds, a third compaction stage, in which the shreds are compacted, a fourth stage for micronization and expulsion of the fragments.

The third compaction stage allows to agglomerate and compact metallic shreds and, for an equal volume, to obtain products with a larger mass.

This is particularly advantageous for the production of foundry scrap. For an equal mass to be obtained it is sufficient to load the crucible a lower number of times by virtue of the compaction of the shreds.

The operation of the shredder 10 according to the disclosure is as follows.

The article to be shredded is inserted within the casing 11 from the inlet 21.

Due to gravity, the article descends and passes through the various stages cited above.

Due to the trend of the circumference of the circular trajectory of the shredding elements 15, which at least partially increases from above downward, as the fragments descend, the space between the individual shredding element 15 and the corresponding complementary shredding elements 36 decreases.

Consequently, the individual, fragment, due to:
the trend of the circumference of the circular trajectory of the shredding elements 15,
the action of the shredding elements 15,
is progressively reduced in volume in passing from upper shredding elements 15 to lower shredding elements 15.

When the shreds reach the base 22 of the casing 11, they already have volumes cut to size and it is therefore not necessary to shred the outsize ones again, as occurs in shredders of the known type. Furthermore, the different materials are already separated. In this manner a filtering grille is no longer necessary.

The coarser and more massive metal pieces are instead the first ones to be expelled due to their mass and to the absence of the grille. As these coarser pieces descend, the shredding elements 15, by virtue of the possibility to oscillate with respect to the respective supporting elements 14, move, making them fall to the lower level and so forth up to expulsion. However, during the crossing of the various stages the coarser and more massive metallic pieces are stripped of any claddings, such as for example sheaths made of plastic material.

In practice it has been found that the disclosure achieves the intended aim and advantages, providing a shredder that allows to shred scrap without the need for precision shredding operations or specific operations in order to be able to separate different types of materials in articles with millimeter or even micrometer size.

Furthermore, the disclosure provides a shredder that does not have a screening grille to obtain shreds of the desired size.

Moreover, the disclosure provides a shredder that is easier, less awkward and quicker to inspect, to clean and maintain with respect to shredders of the known type.

The disclosure thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

What is claimed is:

1. A shredder comprising:
    a tubular casing, which is closed upward by a cover and downward by a base,
    a rotating shaft, which is internal and coaxial to said casing, a plurality of supporting elements being keyed on said shaft, each of said supporting elements configured to support a plurality of shredding elements,
    wherein said shredding elements have circular trajectories with a circumference that at least partially increases from an upper part of the shredder toward a lower part of the shredder, and wherein the shredder has four processing stages including:
    a first crushing stage,
    a second disaggregation stage,
    a third compaction stage, and
    a fourth micronization stage.

2. The shredder according to claim 1, wherein said supporting elements are disc-shaped.

3. The shredder according to claim 1, wherein said shredding elements are flat hammers.

4. The shredder according to claim 1, wherein said shredding elements are coupled to, and are movable with respect to, at least one of said supporting elements.

5. The shredder according to claim 1, wherein said shredding elements comprise a plurality of applied portions.

6. The shredder according to claim 1, wherein at least some of said shredding elements are pivoted, by virtue of hinge elements, to at least two of said supporting elements.

7. The shredder according to claim 1, wherein said casing has an internal surface covered by a plurality of applied elements which can be changed as needed, each one of said applied elements comprising a plurality of complementary shredding elements which extend in the direction of said shredding elements.

8. The shredder according to claim 1, wherein said cover has:
    a first fixed region having an inlet configured for introducing the articles to be shredded inside said shredder, and
    a second region that is openable.

9. The shredder according to claim 8, wherein said second region of said cover is mirror-symmetrical to said first region and is constituted by two portions.

10. The shredder according to claim 9, wherein each one of said two portions has an external arc-shaped surface and is coupled to said first fixed region by a hinge, symmetrically with respect to each other, said hinge being arranged proximate to one end of the arc shape defined by each one of said two portions of said cover.

11. The shredder according to claim 10, wherein said two portions have adjacent ends of said arc shape, said adjacent ends being each opposite with respect to said end coupled to said hinge.

12. The shredder according to claim 9, wherein two corresponding curved and openable portions of said casing are disposed below said two portions of said cover, each one of said corresponding curved and openable portions being coupled to a corresponding one of said two portions of said cover and being hinged to a fixed portion of said casing on the same axis as said hinge, each one of said curved and openable portions being adjacent and symmetrical with respect to a vertical plane of symmetry of said casing.

13. The shredder according to claim 12, further comprising a plurality of superimposed annular elements disposed around tubular walls of said casing, each one of said superimposed annular elements being constituted by portions that are monolithic with a corresponding portion of said casing, each one of said curved and openable portions of said casing having a plurality of arc-shaped quarter-ring portions, each one of said arc-shaped quarter-ring portions corresponding to a part of said superimposed annular elements.

14. The shredder according to claim 13, wherein each one of said arc-shaped quarter-ring portions is coupled, by means of a hinge, to a corresponding portion of a respective one of said superimposed annular elements monolithically with said first fixed portion of said casing.

15. The shredder according to claim 13, wherein one of said curved and openable portions of said casing has a vertically extended flap disposed at the other one of said curved and openable portions, said flap protrudes toward the outside of said casing, said flap being provided with a plurality of openings, each one of said openings being located at one of said superimposed annular elements.

16. The shredder according to claim 15, wherein each one of said openings of said flap is adapted for the insertion of an oscillating element, said oscillating element being pivoted to a corresponding arc-shaped quarter-ring portion of said other openable portion of said casing.

17. The shredder according to claim 16, wherein said oscillating element is provided with a threaded stem for the screwing of one or more nuts configured for fastening said flap to said other openable portion of said casing.

18. The shredder according to claim 12, further comprising a plurality of removable couplings configured for mutual fixing between adjacent edges of said curved and openable portions.

\* \* \* \* \*